US008792374B1

(12) United States Patent
Jain et al.

(10) Patent No.: US 8,792,374 B1
(45) Date of Patent: Jul. 29, 2014

(54) MANAGING NETWORK ROUTES FROM A CENTRAL SERVER

(75) Inventors: Sushant Jain, Sunnyvale, CA (US); Alok Kumar, Fremont, CA (US); James M. Wanderer, Palo Alto, CA (US); Aspi Homi Siganporia, Saratoga, CA (US); Anand Raghuraman, Campbell, CA (US); Subhasree Mandal, San Jose, CA (US); Arjun Singh, Mountain View, CA (US); Subbaiah Naidu Kotla Venkata, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 192 days.

(21) Appl. No.: 13/314,015

(22) Filed: Dec. 7, 2011

(51) Int. Cl.
*H04L 12/26* (2006.01)
*H04L 12/56* (2006.01)

(52) U.S. Cl.
CPC .................................... *H04L 47/10* (2013.01)
USPC .......................................... 370/252; 370/389

(58) Field of Classification Search
CPC ............................. H04L 47/00; H04L 43/00
USPC .................. 370/252, 389; 709/220, 221, 238
See application file for complete search history.

(56) References Cited

U.S. PATENT DOCUMENTS 6,243,864 B1* 6/2001 Odani et al. ................... 717/154
7,958,209 B2* 6/2011 Gous et al. .................... 709/221
8,108,495 B1* 1/2012 Zuk et al. ...................... 709/220
2001/0019554 A1* 9/2001 Nomura et al. ............... 370/389
2004/0218535 A1* 11/2004 Liong et al. ................... 370/238
2012/0069739 A1* 3/2012 Yabusaki et al. ............. 370/235

OTHER PUBLICATIONS

Aukia, P et al., "RATES: A Server for MPLS Traffic Engineering," IEEE, Network, vol. 14, No. 2, Mar./Apr. 2000, pp. 34-41.
Matsui, K. et al., "TRES: Traffic and Reliability Engineering Server for MPLS," IEEE Pacific Rim Conference on Communications, Computers and Signal Processing, 2001, pp. 583-586.
Sakurai, T. et al., "Traffic Engineering Technical Server for Centralized Traffic Control over Large Scale MPLS Network," IEIC Technical Report, vol. 102, No. 694, 2003, pp. 267-272.
Scoglio, C. et al,, "TEAM: A Traffic Engineering Automated Manager for DiffServ-Based MPLS Networks," IEEE Communications Magazine, Oct. 2004, pp. 134-145.

* cited by examiner

*Primary Examiner* — Andrew Lai
*Assistant Examiner* — Sumitra Ganguly
(74) *Attorney, Agent, or Firm* — Foley & Lardner LLP; Edward A. Gordon

(57) ABSTRACT

Embodiments are directed towards managing network routes using a centralized service on behalf of a network of a plurality of forwarding devices. The centralized service develops a global view of the network based on information from the forwarding devices. The centralized service computes changes to the routing policy for each of the nodes. The centralized service then generates an operational command schedule that is distributed to the forwarding devices using a "make before break" sequence to ensure that transient black holes do not happen as the new routing policy is being implemented.

20 Claims, 8 Drawing Sheets

MANAGING NETWORK ROUTES FROM A CENTRAL SERVER

TECHNICAL FIELD

The present invention relates generally to managing network routes, and, more particularly, but not exclusively to managing network route configurations using a centralized service for managing route changes in a network structure of forwarding devices.

BACKGROUND

In today's world, communications using networking architectures, such as the Internet, local area networks, or the like, has penetrated almost everybody's life. The underlying structure of such networks, typically involve client and/or server devices that may be interconnected together through switches, routers, gateways, and a variety of other forwarding devices that are arranged to assist in transferring of packets between the client and/or server devices. There are a variety of arrangements of forwarding devices that may be employed to provide for a plurality of possible different paths within or across networks over which a packet may be routed between the client and/or server devices.

Traditional networks are often configured to route packets using what is known as a distributed system model. In a distributed system model, each forwarding device within the network determines their own routing policy that is used to determine how to forward packets through the network from one location to another location. Such forwarding devices may broadcast messages or otherwise communicate with other devices within the network to provide information about their own state. State information received from other devices within the network may also be used by each device to assist them in constructing their own local view of the network.

Each of these forwarding devices may then execute a routing algorithm based on their own local view to generate a routing table that is used to determine how to route packets. In this distributed system model, while each forwarding device may receive information about other devices within the network, each forwarding device still constructs their own routing policy and related routing table independently of another forwarding device. This independent (or distributed) routing approach may sometimes result in conflicts between forwarding devices resulting in transient looping of packet forwarding. Sometimes, such looping may take considerable time to converge, resulting in delayed and/or lost packets.

Further, in some distributed system models, it may be difficult to optimize network performance over many forwarding devices, since each forwarding device ultimately modifies their routing policy independent of other forwarding devices. Such distributed system models are often non-deterministic, resulting in increases in costs to debug, and/or to manage security issues, as well as to provide for flexibility, and reliability. Distributed system models may sometimes even slow down deployment of new technologies, policies, algorithms, standards, protocols, or the like. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
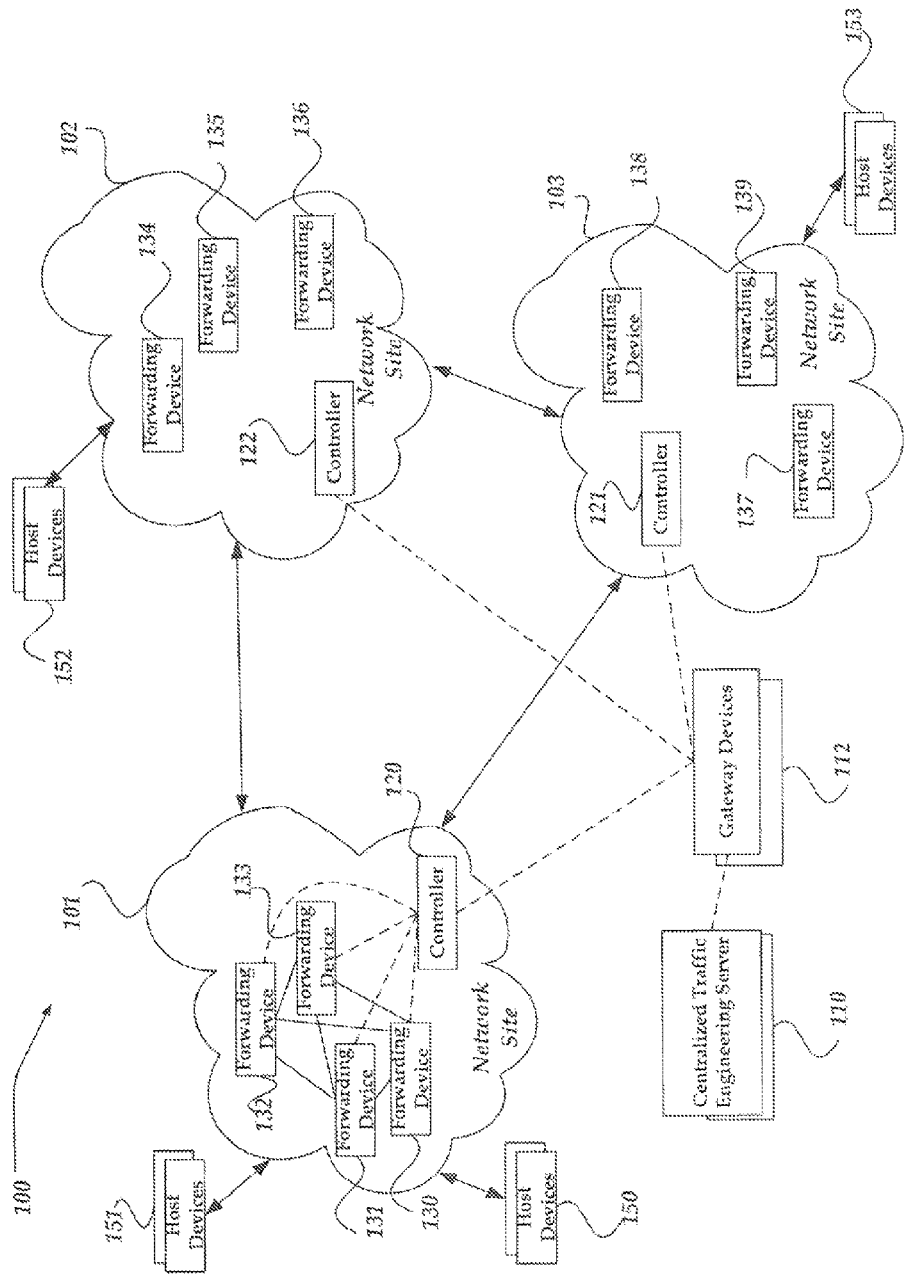
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "routing," refers to a process of forwarding packets along a path or route of one of more network devices within a network structure so that the packets may reach a destination.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards managing changes to network routes using a centralized service on behalf of a network composed of a plurality of forwarding devices. The centralized service is configured to receive state information from the forwarding devices to develop a global view of the network of the plurality of forwarding devices. The centralized service then runs any of a variety of routing algorithms to compute routes for each of the nodes to employ when forwarding received packets within and/or across the network. The centralized service then communicates to each of the forwarding devices changes to the routes as a routing policy useable to update a given forwarding device's routing table, or other route information mechanism, in a manner that is directed towards ensuring that during a transition from one routing policy to another, packets are not lost. In one embodiment, the centralized service determines how to transmit the changes to the routes as operational commands using a "make before break" schedule of transmissions that are directed towards minimizing transient black holes in the centrally managed network.

Thus, the centralized service is configured to determine the route information for the forwarding devices rather than having such determination being performed by the forwarding devices individually. In this manner, the herein disclosed centralized actions are directed towards addressing at least some of the problems identified above in a distributed systems model.

Illustrative Operating Environment

FIG. 1 shows components of one embodiment of an environment in which a centralized route management approach may be practiced. Not all the components may be required to practice various embodiments, and variations in the arrangement and type of the components may be made. As shown, system 100 of FIG. 1 includes a plurality of networks 101-103, host devices 150-153, gateway devices 112, and Centralized Traffic Engineering (CTE) Server 110. Each of networks 101-103 includes a plurality of forwarding devices and a controller device. For example, as illustrated, network 101 includes forwarding devices 130-133, and controller 120; network 102 includes forwarding devices 134-136, and controller 122; and network 103 includes forwarding devices 137-139, and controller 121. It should be noted that a given network may include many more or less forwarding devices than illustrated in FIG. 1, and it should be understood that those shown are merely representative of possible configurations. Moreover, while connections between forwarding devices are illustrated within network 101 and absent for networks 102-103, such absence is for simplicity of the drawing, and is not intended to indicate that such forwarding devices are not interconnected. In one embodiment, such interconnections may, for example, take any of a variety of topologies, including, but not limited to a star topology.

Generally, host devices 150-153 represent any of a variety of computing devices that are arranged to receive requests for information, send requests for information, and/or to provide information, including information in response to a request. In some embodiments, such host devices 150-153 may be referred to as client devices and/or server devices. Typically, the term "client" refers to a computer's general role as a requester of data or services, and the term "server" typically refers to a computer's role as a provider of data or services. In general, it is possible that a computer can act as a client, requesting data or services in one transaction and act as a server, providing data or services in another transaction, thus changing its role from client to server or vice versa. Thus, as used herein the term host device refers to a computing device that may operate as either a server and/or as a client.

Therefore, host devices 150-153 may include virtually any computing device capable of receiving and sending information over a network, such as networks 101-103 or the like. Host devices 150-153 may, in one embodiment, include devices that are configured to be portable. Thus, host devices 150-153 may include virtually any portable computing device capable of connecting to another computing device and receiving information. Such portable devices include for example, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, host devices 150-153 typically range widely in terms of capabilities and features. For example, a cell phone may have a numeric keypad and a few lines of monochrome Liquid Crystal Display (LCD) on which only text may be displayed. In another example, a web-enabled mobile device may have a touch sensitive screen, a stylus, and several lines of color LCD in which both text and graphics may be displayed.

Client devices 150-153 may also include virtually any "non-portable" computing device capable of communicating over a network to send and receive information, including messaging, performing various online actions, or the like. The set of such devices may include devices that typically connect using a wired or wireless communications medium such as personal computers, multiprocessor systems, microprocessor-based or programmable consumer electronics, network Personal Computers (PCs), or the like. In one embodiment, at least some of host devices 150-153 may operate over wired and/or wireless network. Client devices 150-153 may further include virtually any device useable as a television device. Today, many of these devices include a capability to access and/or otherwise communicate over a network such as networks 101-103. Moreover, client devices 150-153 may access various computing applications, including a browser, or other web-based application.

A web-enabled host device may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like, to display and send a message. In one embodiment, a user of the client device may employ the browser application to perform various actions over a network (online). For example, the user of the host device may select to access and manage a user message account, send messages, organize messages, create user folders or the like. However, another application may also be used to perform various online actions.

Host devices 150-153 also may include at least one other application that is configured to access and/or manage user message accounts, between other computing devices. The application may include a capability to provide and receive textual content, graphical content, audio content, and the like. The application may further provide information that identifies itself, including a type, capability, name, and the like. In one embodiment, host devices 150-153 may uniquely identify themselves through any of a variety of mechanisms, including a phone number, Mobile Identification Number (MIN), an electronic serial number (ESN), an Internet Protocol (IP) address, or other device identifier. In one embodiment, such identification may be included within a packet header, such as where the packet is in a form of a Transmission Control Protocol (TCP)/IP packet. In one embodiment, information within such packet formats may include a source address indicating an origin of the packet. The packet may also include a destination address indicating a termination or destination of the packet being transmitted. The source and/or destination information may take any of a variety of forms, including but not limited to TCP/IP address information, port address information, quality of service information, and/or any of a variety of other types/forms of information that may be useable to determine how to route a packet from a source to a destination. The information may also indicate a content format that a device is enabled to employ.

Host devices 150-153 may further be configured to include an application that enables an end-user to log into a user message account that may be managed by another computing device. Such user message account, for example, may be configured to enable the user to manage one or more online actions, including for example, compose messages, delete messages, replay to messages, forward messages, archive messages, create folders, move messages to folders, or the like.

As shown in the figure, host devices 150-153 may receive requests and/or respond to requests for information. In one embodiment, for example, host devices 150 may seek to send information to host devices 151 using network 101. The information may be partitioned into a plurality of packets that may then be sent from host devices 150 to one of forwarding devices 130-133 within network 101. The forwarding devices 130-133 may then select a path between the other forwarding devices within network 101, and forward the received packets using the selected path to provide the packets to host device 151. In this example, the host device 150 may sometimes be referred to as a source device, for being a source of the sent packets, while host device 151 may be referred to a destination device, for being a destination of the sent packets.

Networks 101-103 are configured to couple host devices 150-153 and their components with each other and/or with other host devices. Networks 101-1030 may include any of a variety of wireless configurations that may further overlay stand-alone ad-hoc networks, and the like, to provide an infrastructure-oriented connection for host devices 150-153. Such infrastructures may include mesh networks, Wireless LAN (WLAN) networks, cellular networks, and the like.

Networks 101-103 may further include a system of forwarding devices, gateways, controllers, and the like connected by wireless radio links, and the like. These connectors may be configured to move freely, such that the topology of networks 101-103 may change rapidly.

Networks 101-103 may further employ a plurality of access technologies including 2nd (2G), 3rd (3G), 4th (4G), 5th (5G) generation radio access for cellular systems, WLAN, Wireless Router (WR) mesh, and the like. Access technologies such as 2G, 3G, 4G, and future access networks may enable wide area coverage for mobile devices, with various degrees of mobility. For example, networks 101-103 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, networks 101-103 may include virtually any wireless communication mechanism by which information may travel between host devices 150-153 and another computing device, network, and the like.

Networks 101-103 may also be configured to employ any form of wired communication mechanisms for communicating information from one electronic device to another. In one embodiment, networks 101-103 can represent local area networks (LANs), or even wide area networks (WANs), using direct connections, such as through a universal serial bus (USB) port, other forms of computer-readable media, or any combination thereof. On an interconnected set of networks, such as illustrated in FIG. 1, a forwarding device or gateway devices 112 may act as a link between networks 101-103, enabling messages to be sent from one location to another. In addition, communication links within networks 101-103 typically include twisted wire pair or coaxial cable, while communication links between networks may utilize analog telephone lines, full or fractional dedicated digital lines including T1, T2, T3, and T4, integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within networks 101-103. Furthermore, remote computers and other related electronic devices could be remotely connected to networks 101-103 via a modem and temporary telephone link. In essence, networks 101-103 include any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, computer-readable devices described in more detail below.

Forwarding devices (FDs) 130-139 include virtually any network element configured to receive a packet and to retransmit it, or forward it, towards a destination. FDs 130-139 may be used to extend or segment a network by forwarding the packet from one network element to another, or even one logical network to another. FDs 130-139 typically operate at layer 3 and below in the standard OSI reference model for networking. However, some of FDs 130-139 may provide additional functionality that operates above layer 3 of the OSI reference model. In one embodiment, FDs 130-139 may receive information useable to implement a routing table that contains route information. However, FDs 130-139 are not limited to implementing route information through routing tables, and other mechanisms may also be employed to store route information. For example, such route information may also be managed within a route database, spreadsheet, file structure, or the like.

In any event, route information may be used by FDs 130-139 to determine how to forward received packets. Route information may vary depending on how the route is generated. That is, in one embodiment, route information may be based, at least in part, on a routing algorithm that may be employed to generate a route. That is, any of a variety of routing algorithms may be employed to generate a route, including, distance vector algorithms such as Routing Information Protocol (RIP), IGRP, Real-Time Transport Protocol (RTP), Routing Table Maintenance Protocol (RTMP), or the like. Routing algorithms may also include, link state algorithms, such as Open Shortest Path First (OSPF), Intermediate System-to-Intermediate System (IS-IS), or any of variety of other algorithms. It should be noted that the various embodiments disclosed herein are not constrained to any particular routing algorithm.

Further, route information may, for example, include information such as network addresses, or the like, that is useable to indicate a destination or next hop, information. In one embodiment, route information may include information useable to classify a path or route. For example, in one embodiment, route information may include information that categories a path according to a tunnel, tunnel group, and a flow group.

Thus, as used herein, the term "tunnel" may be employed to define a network path as a sequence of forwarding devices. In one embodiment, a tunnel may include a variety of attributes about the tunnel, including, but not limited to a globally unique identifier, and a tunnel tag. For example, in one embodiment, a tunnel tag might be an IP address or the like.

Also, as used herein, the term "tunnel group," refers to a collection of tunnels. In one embodiment, a tunnel group may include an associate weight or weighting that is useable to indicate a preference of one tunnel group over another tunnel group. Attributes associated with a tunnel group may include, a unique identifier, a collection of <tunnel_id, weight> tuples, and the like. Further, as used herein, the term "flow group," refers to a mapping from a "destination device" to a tunnel group. Flow group attributes might include a globally unique identifier, source and destination information, a set of destination prefixes. For example, in one embodiment, a packet's destination IP address might be matched against such destination information to determine the packet's path information. Flow group information may also include, for example, information such as a quality of service indicator.

In one embodiment such route information may be used by a forwarding device to determine a set of tunnels for a given destination device. In one embodiment, a flow group may have various attributes associate with it, including, a unique identifier, and a tunnel group identifier. In one embodiment, each of FDs 130-139 may include a collection of the above elements (tunnel, tunnel group, flow group), and the like. Such collection of elements may be managed within a routing table, or other mechanism, as mentioned above. In one embodiment, such routing table or other mechanism may be referred to generally as an FD's Traffic Engineering Database (TED).

In one embodiment FDs 130-139 receive route information useable to manage their TEDs from a centralized service, such as might be managed by CTE server 110, or the like. In another embodiment, FDs 130-139 may also generate and maintain default route information that may be employed instead of route information obtained through CTE server 110. Selection of which route information FDs 130-139 employ are described in more detail below. In one embodiment, route information from CTE server 110 may be stored in a different TED, routing table, or the like, from that default route information.

Briefly, the default route information may be generated by each FD substantially similar to how it might be generated in a distributed systems model described above. That is, each FD may select from any of a variety of routing algorithms to generate and manage its own separate default routing tables, using its own routing policies.

FDs 130-139 may also be referenced according to where in a sequence of FDs a given FD may operate. Thus, in one embodiment, an FD may receive a packet from a host device, where the packet is to be routed towards a destination host device. The first receiving FD may sometimes be referred to as a source FD, since it is the FD that first receives the packet from a source host device. The packet may then be forwarded to one or more FDs that may be referred to herein as intermediate FDs. A last FD that then forwards the packet to a destination host device is referred to herein as a destination FD. In any event, FDs may employ a process such as described below in conjunction with FIG. 8 to forward packets.

Controllers 120-122 represent any of a variety of network computing devices that are configured to manage FDs 130-139 within a given network (101-103). In one embodiment, controllers 120-122 might receive information about, a state, network traffic load, or the like, from FDs 130-139 and provide the information for use by CTE server 110. Similarly, controllers 120-122 may receive changes to a routing policy and other route information, in the form of operational commands that are to be distributed outward to various FDs 130-139. Thus, in at least one embodiment, controllers 120-122 may be directed towards providing a simplistic interface for communicating routing information between components within one or more of networks 101-103. Thus, controllers 120-122 propagate network state changes between gateway devices 112 and FDs 130-139. Typically, controllers 120-122 may not have a global view, however, of a network or across networks, but, instead operate in conjunction with CTE server 110.

Gateway devices 112 represent any of a variety of computing devices that are configured to export network state information, such as topology, route information, including operational commands, network traffic information, and so forth between a network's controller, and CTE server 110. In some embodiments, gateway devices 112 may also enable packets to be moved between networks 101-103. For example, host device 150 might select to send packets to a host device such as host device 152 or 153. As such, gateway devices 112 may receive packets from a forwarding device within network 101 and, operating as a forwarding device, determine a forwarding device to route the received packets towards. However, in other embodiments, forwarding devices within one network may also be configured to forward packets to forwarding devices within another network without using gateway devices 112 as an intermediate forwarding device.

CTE server 110 represents any of a variety of computing devices that are configured to operate as a global, centralized routing service for determining and managing paths within networks 101-103. Thus, CTE server 110 manages route information on behalf of the forwarding devices 130-139. In one embodiment, CTE server 110 receives various state information about each FD within a given network infrastructure, such as one or more of networks 101-103. CTE server 110 may further receive and/or otherwise determine a network demand for each of the plurality of FDs and links between FDs within the one or more networks. CTE server 110 may also determine a set of paths between various source-destination pairs of FDs within one or more networks. Then, CTE server 110 may determine for each FD a set of paths a desired state, and a difference between the received state information and the desired state. CTE server 110 further defines an operational command schedule based on the determined differences, where the schedule is arranged in a sequence of commands directed towards creating a new path structure before breaking an existing path structure between FDs. This schedule is then transmitted outwards to controllers 120-122 for distribution to relevant FDs, in a manner that makes new routes before breaking existing ones, as described further below. CTE server 110 may employ, in one embodiment, a process such as described below in conjunction with FIG. 7 to perform at least some of its actions.

Devices that may operate as CTE server 110, gateway devices 112, and/or controllers 120-122 include various network devices, including, but not limited to personal computers, desktop computers, multiprocessor systems, microprocessor-based or programmable consumer electronics, network PCs, server devices, network appliances, and the like. It should be noted that CTE server 110 may represent a plurality of network devices. For example, in one embodiment CTE server 110 may be configured to include different CTE servers, each CTE server being dedicated to a different one of networks 101-103. In another embodiment, CTE server 110 may include one or more other CTE servers configured to operate in a fail-over, or failure mode of operation. In still another embodiment, CTE servers may be configured to operate within a cloud architecture, peer-to-peer architecture, cluster architecture, or the like, where one or more of its functions may be distributed across a plurality of network devices.

Figure 2:
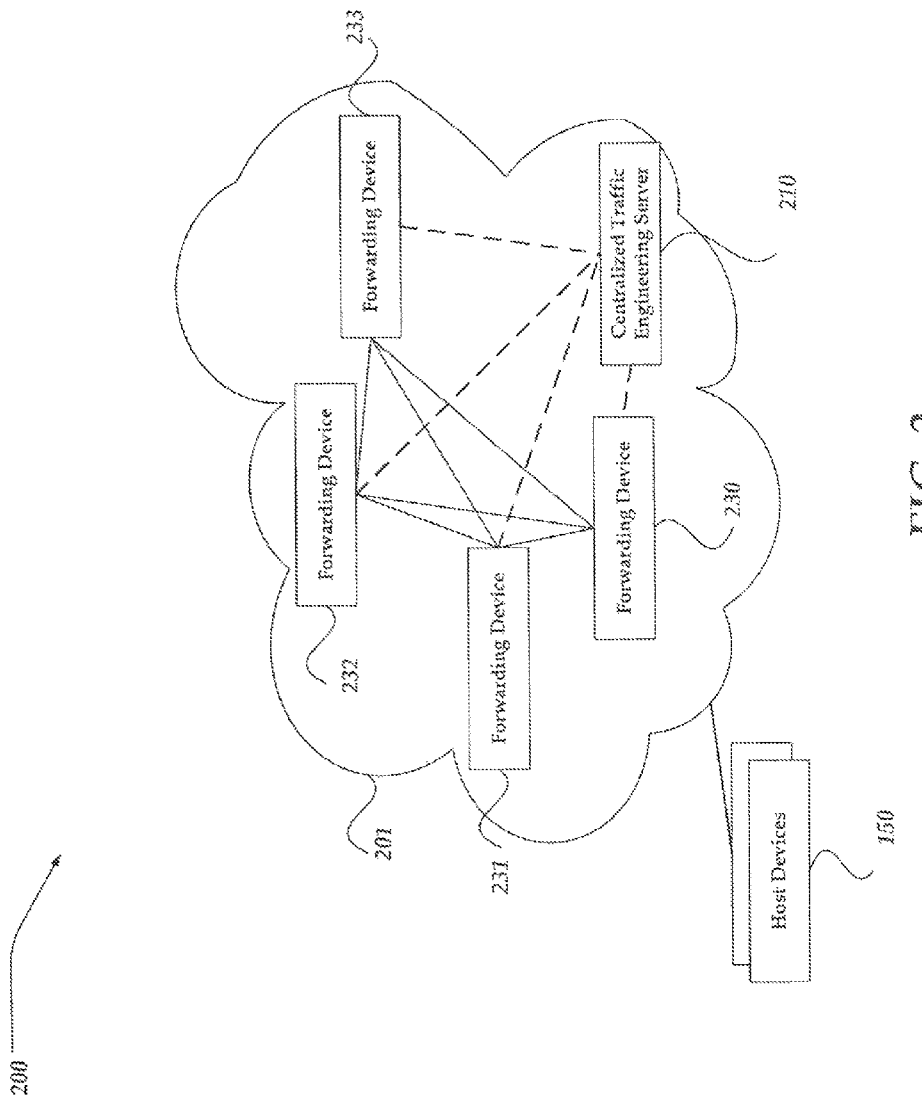
FIG. 2 shows another embodiment of an environment in which the invention may be practiced.

As described above in conjunction with FIG. 1, CTE server 110 typically communicates with the FDs through a controller. However, in other embodiments, CTE server 110 may communicate with the FDs 130-139 directly. Further, while FIG. 1 illustrates CTE server 110 to be external to networks 101-103, other embodiments are not so limited. Thus, for example, as illustrated in FIG. 2, CTE server 210 is shown as within a given defined network 201. However, each of FDs 230-233 is configured to still receive route information from CTE server 210.

As shown, Network architecture 200 of FIG. 2 may include many more or less components than those shown. The components shown, however, are sufficient to disclose an illustrative embodiment for practicing the invention. Thus, as illustrated, Network architecture 200 includes network 201 and host devices 150. Host devices 150 are substantially similar and therefore operate similar to host devices of FIG. 1. Similarly, FDs 230-233 are substantially similar and therefore operate similar to the FDs illustrated in FIG. 1. However, as shown, in one embodiment, CTE server 210 may replace a controller (such as shown in FIG. 1) and therefore operate within defined network 201 to perform functions of both a controller, and a centralized traffic engineering server. However, in another embodiment, network 200 may also include a controller device such that CTE server 210 may still communicate with FDs 230-233 through a controller device. Thus, as discussed above, there are a variety of architectures and/or environments that may be employed using the herein disclosed centralized route services, and therefore, such centralized route services are not to be construed as being limited to any particular configuration or arrangement of network devices, networks, or the like.

Illustrative Network Device

Figure 3:
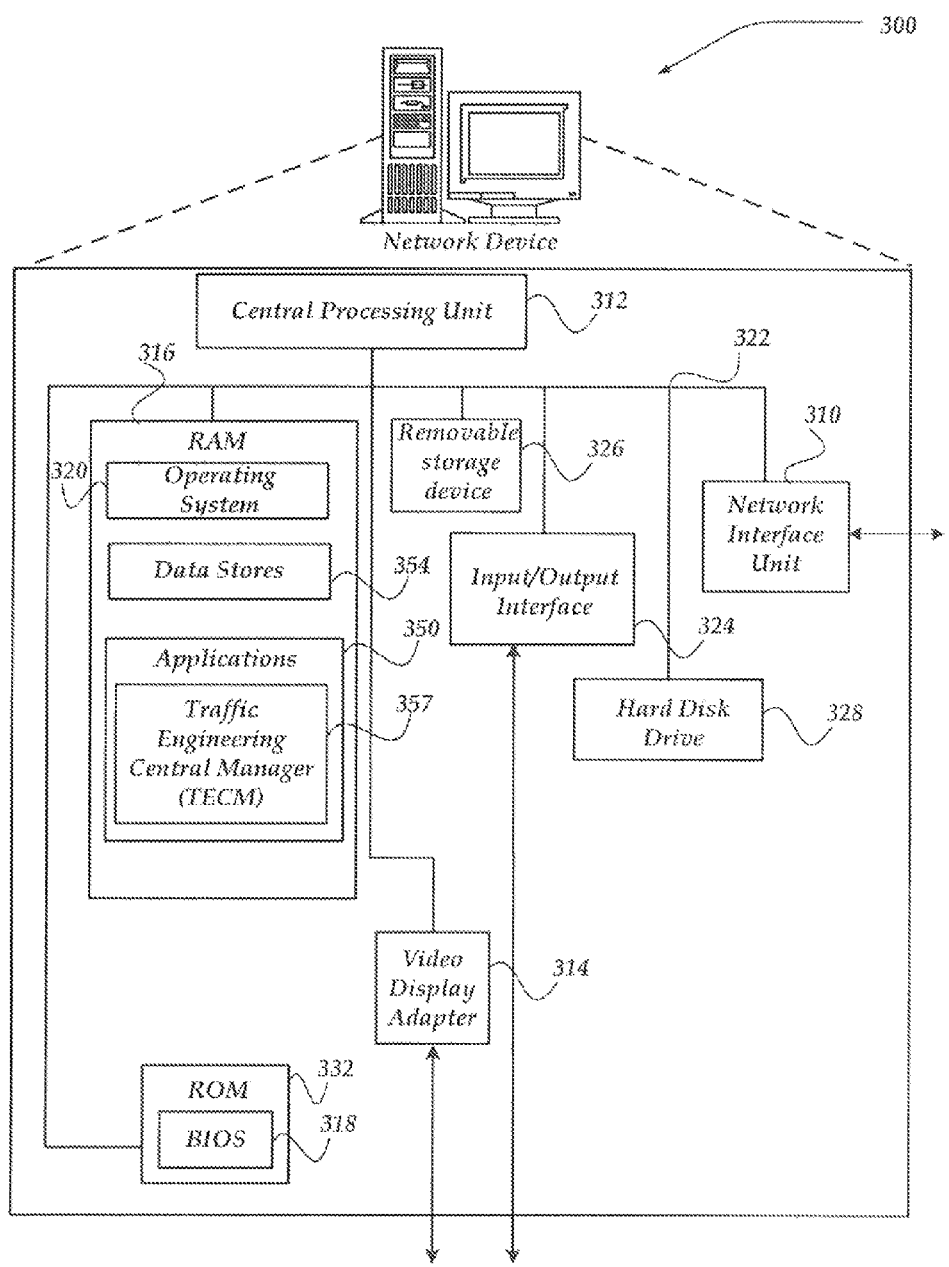
FIG. 3 shows one embodiment of a network device that may be to operate as a Traffic Engineering Central Manager (TECM) device.

FIG. 3 shows one embodiment of a network device 300, according to one embodiment that may be useable as CTE server 110 of FIG. 1 and CTE server 210 of FIG. 2. Network device 300 may include many more or less components than those shown. The components shown, however, are sufficient to disclose an illustrative embodiment for practicing the invention.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, flash drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in. FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of non-transitory computer-readable media, namely computer-readable storage media. Computer-readable storage media are physical devices that may include volatile, nonvolatile, removable, and non-removable media implemented in any method or technology for storage of information, such as computer readable instructions, data structures, program modules, or other data. Examples of computer readable storage media include RAM, ROM, Electronically Erasable Programmable Read-Only Memory (EEPROM), flash memory or other memory technology, Compact Disc Read-Only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computing device.

As shown, data stores 354 may include a database, text, spreadsheet, folder, file, or the like, that may be configured to maintain and store network demand information, including demands or loads on a given link, costs of a given link, link capacities, loads and/or demands on or the like. Data stores 354 may also store various routing algorithms, route information, architecture information, and the like, usable by network device 300 to centrally manage changes to a routing policy, route information and the like, for a plurality of forwarding devices. Thus, in one embodiment, data stores 354 may include a master TED that includes information useable for centrally managing route configurations within one or more networks of forwarding devices.

Data stores 354 may further include program code, data, algorithms, and the like, for use by a processor, such as central processing unit (CPU) 312 to execute and perform actions. In one embodiment, at least some of data and/or instructions stored in data stores 354 might also be stored on another device of network device 300, including, but not limited to removable storage device 326, hard disk drive 328, or other computer-readable storage device resident on network device 300 or accessible by network device 300 over, for example, network interface unit 310.

The mass memory also stores program code and data. One or more applications 350 are loaded into mass memory and run on operating system 320. Examples of application programs may include transcoders, schedulers, calendars, database programs, word processing programs, Hypertext Transfer Protocol (HTTP) programs, customizable user interface programs, IPSec applications, encryption programs, security programs, message servers, account managers, and so forth.

Traffic Engineering Central Manager (TECM) 357 may also be included as application programs within applications 350. In one embodiment, TECM 357 may also be stored as computer-executable instructions in a computer-readable storage device such as those described above, such that when the computer-readable storage device is installed into a computing device, such as network device 300, or the like, CPU 312 may then execute the computer-executable instructions to perform various actions including those disclosed herein for TECM 357.

Briefly, TECM 357 may be configured to receive state information from each forwarding device within a plurality of forwarding devices within a defined network, such as networks 101-103 of FIG. 1 and/or network 201 of FIG. 2. TECM 357 may further determine a network demand for each of the plurality of forwarding devices within the defined network. In one embodiment, such demand may be predicted based on information received about expected loads of a given link or connection between forwarding devices. Demand may also be determined based on actual load or usage information, such as current usage, historical usage, or the like. TECM 357 may then determine a set of paths between source-destination pairs of forwarding devices within the plurality of forwarding devices. For each forwarding device in the plurality of forwarding devices, TECM 357 may determine from the set of paths a desired state, and a difference between the received state information and the desired state. TECM 357 may also define an operational command schedule based on determined differences, where the operational command schedule is arranged in a sequence that makes a completed new path structure before breaking an existing path structure between forwarding devices. TECM 357 may then transmit or otherwise communicate towards affected forwarding devices each operational command within the operational command schedule based on the arranged sequence.

Although TECM 357 is illustrated as a single application, the invention is not so limited. For example, TECM 357 may also represent a plurality of applications that may operate within a single network device, as illustrated, or within a plurality of network devices using any of a peer-to-peer architecture, cloud architecture, cluster architecture, or the like.

Thus, for example, TECM 357 may include a flow group stats manager component, a configuration manager components, a topology manager component, a path allocator component, a tunneling manage component, or the like. In one embodiment, the flow group stats manage may receive and mange flow group statistical reports for flow groups. In one embodiment, the flow group stats manager may aggregate multiple flow group reports into a single flow group report.

Configuration Manager may manage various system attributed including flow group parameters, site edge parameters, and the like. Topology manager may be configured to communicate with various gateway devices, and retrieve current status information for a network. Path allocator component may be responsible for determining path assignments, and providing a list of paths and weights. Tunneling manager may be configured to implement path assignments with a network by coordinating installation of a TED into each network controller within a network. It should be noted that while the above illustrates one distribution of components of TECM 357, others are also envisaged, and thus the invention is not limited to a particular arrangement. Moreover, in at least one embodiment, TECM 357, network device 300, and the like, may be configured and managed for possible fail-over situations, where another network device may be arranged to assume operations shown network device 330 and/or TECM 357 may fail. In any event. TECM 357 may employ, in one embodiment, a process such as described below in conjunction with FIG. 7 to perform at least some of its actions.

Generalized Operation

The operation of certain aspects of the invention will now be described with respect to FIGS. 4-8. In one embodiment, it is desirable to implement non-equal cost paths in a network between a given pair source-destination pair of forwarding devices.

Figure 4:
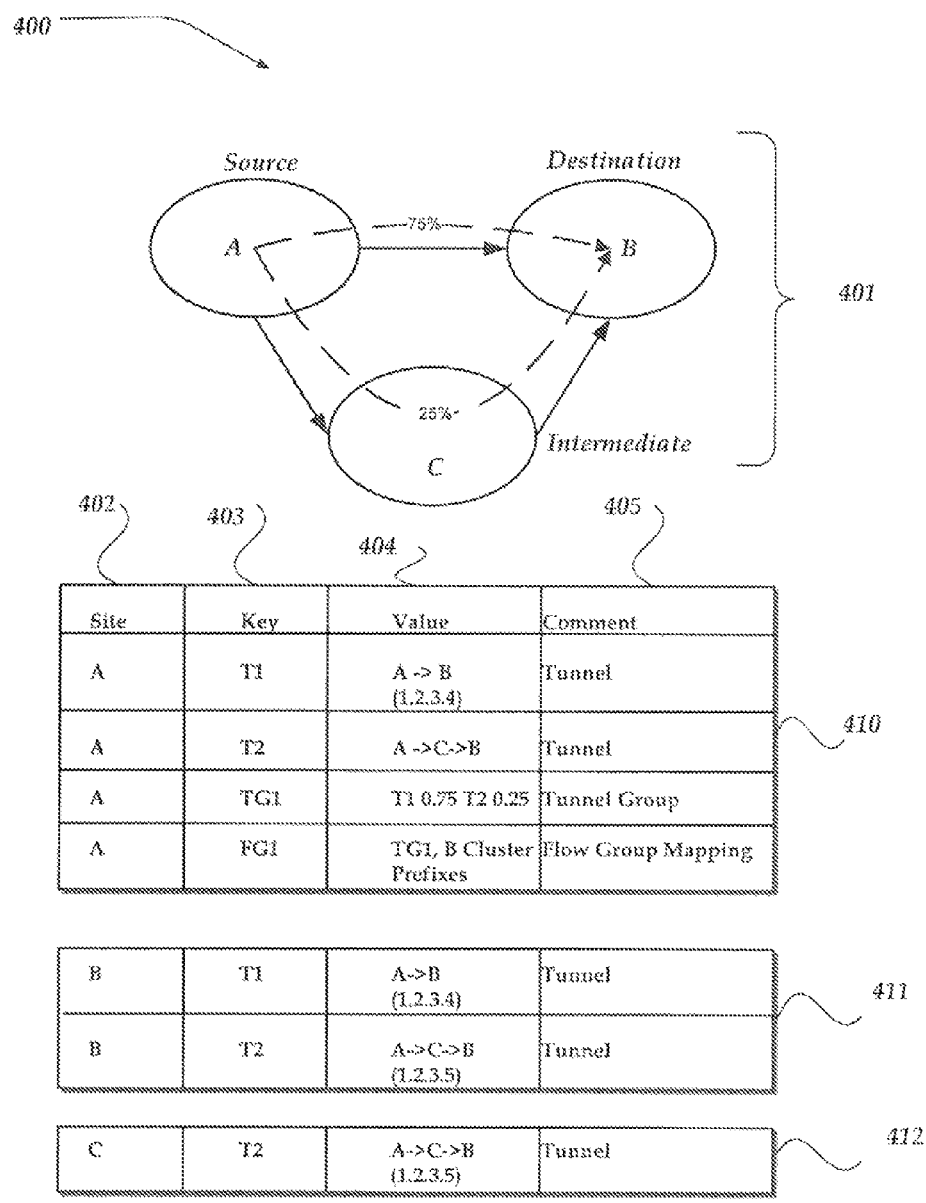
FIG. 4 illustrates one non-exhaustive, non-limiting example of a network topology with desired Traffic Engineering Database (TED) states.

FIG. 4 illustrates one non-exhaustive, non-limiting example of a network topology with desired Traffic Engineering Database (TED) states. Illustration 400 of FIG. 4 may include many more or less components than those shown. The components shown, however, are sufficient to disclose an illustrative embodiment for practicing the invention.

However, shown in FIG. 4 is a simplified topology 401 of three forwarding devices A, B, and C. Forwarding device A is shown as a source device, forwarding device C is shown as an intermediate device, and forwarding device B is illustrated as a destination device. In topology 401, it is illustrated that it is desired that 75% of the network traffic is to be sent directly from forwarding device A to forwarding device B, while 25% of the network traffic is to be sent via the longer path from forwarding device A to forwarding device C and then to forwarding device B. The weights of 75% and 25% may be determined based on a variety of criteria, such as a cost to operate, a type of link between the forwarding devices, a physical distance or other physical characteristic of the links, and/or any of a variety of other selectable criteria. As an aside, the term "link" refers to the connection or path between two forwarding devices, independent of its physical structure. In one embodiment, a total of all possible paths between a source and destination are directed towards having their weights sum to a normalized value, such as 100%, 1.0, or the like.

Thus, as shown in topology 401, a flow group mapping may be defined. For example, in one embodiment a new desired TED might be defined as:

FG1→use TG1, where FG indicates flow group, and TG indicates tunnel group;

TG1→use {T1 0.75, T2 0.25} indicating frequency of use of a given tunnel T;

T1→Path is: A→B; and

T2→Path is: A→C→B.

Then, as discussed above, a TED may be generated that defines a state needed at each forwarding device to implement the paths. Every forwarding device is configured to receive from the centralized service route or path information that is sufficient to enable the forwarding device to have its own TED. TEDs may include a variety of information, including, as noted above, tunnel information, tunnel group information, and flow group information. In one embodiment, the TED might be implemented in a form such as a table, although other configurations, arrangements, or the like, may also be used.

As a table, each element in the TED representing at least a portion comprising a route mapping, may be a row, while each row may include such attributes, for example: a key—such as a globally unique identifier, where the keys may be referenced across various site TEDs and therefore are globally unique; a value that might include contents that depend upon the element type; and a status. The status, which is described further below might indicate whether a content element is clean—indicating that the data is consistent and no further action is needed, or is dirty indicating that the data is potentially inconsistent, incomplete, or pending, and further actions may be needed. Shown in FIG. 4 are possible TED tables 410-412 that have been separated based on a particular forwarding device. Thus, as shown, TED table 410 may represent path (route) information for site or forwarding device A of topology 401; TED table 411 may represent route information for forwarding device B; and TED table 412 may represent route information for forwarding device C.

As shown, column 402 indicates the affected forwarding device (site), column 403 represents possible keys, column 404 represents possible values, and column 405 indicates a characteristic of the information illustrated.

In one embodiment, CTE server 110 of FIG. 1, may create the TED tables 410-412 and provide information based on these tables to the affected forwarding devices A-C of topology 401. In one embodiment, the centralized server could employ one or more remote procedure calls (RPCs) to send each forwarding device, or associated controller (not shown in topology 401) the TEDs to install.

Once each of the forwarding devices implemented their respective route information, packets could be routed on the identified paths. However, merely sending such route information to the forwarding devices might result in possible black-holed situations. For example, consider where packets might be sent by source A to intermediate C based on its table 410. However, it might be that intermediate C has not yet implemented its table, and thus, packets received for forwarding by intermediate C could be dropped.

Therefore, to address this situation, the centralized server is configured to manipulate individual entries in the TED for each forwarding device by issuing an operation or operational command towards each forwarding device in a particular schedule. While any of a variety of formats for the operational command may be employed, in one embodiment, the operational (op) commands might include: Site or forwarding device information; Op_type: such as added, modified, deleted, or the like; Key; and a value. In one embodiment, a given 'op command' might refer to either a tunnel, tunnel group, or a flow group for a given forwarding device.

In one embodiment, the centralized service, such as CTE server 110, may be configured such that entries that have changed might be replayed, while entries in a TED that have not changed, need not be sent. Moreover, CTE servers may send multiple op commands at substantially a same time, thereby improving efficiency. Further, a forwarding device that receives an op command responds indicating success or failure of implementation of the op command.

The CTE server manages route information at a per forwarding device level. Therefore, the CTE server has information and receives other information about a current status of each forwarding device, and its current route information. The CTE server may then determine a desired new TED of route information for each forwarding device. From the current route information and the desired new TED route information, the CTE server may find a difference (diff) between the desired TED and the current TED for each forwarding device. The diff information may then be mapped to a set of op commands, such as add, delete, or modify commands that may be sent to a given forwarding device to update the respective forwarding device's route information.

To prevent any transient black holing, where portions of a route might be incompletely implemented, the CTE server identifies a schedule that includes a sequence for sending op commands that is arranged to fully make a route prior to breaking a route. For example, it is desired to make sure that a tunnel is completely implemented before it is to be used. Thus, when a new TED route to be implemented, then any TED element that the new route refers to is already installed prior to the use of the TED route. For example, any tunnel is fully installed before a tunnel group is installed. Similarly, a tunnel group is fully installed before it can be used by a flow group.

One embodiment for ensuring such make before break approach may be obtained through a use of an op dependency graph. However, other mechanisms may also be employed, and as such, the invention is not limited to merely dependency graphs.

Figure 5:
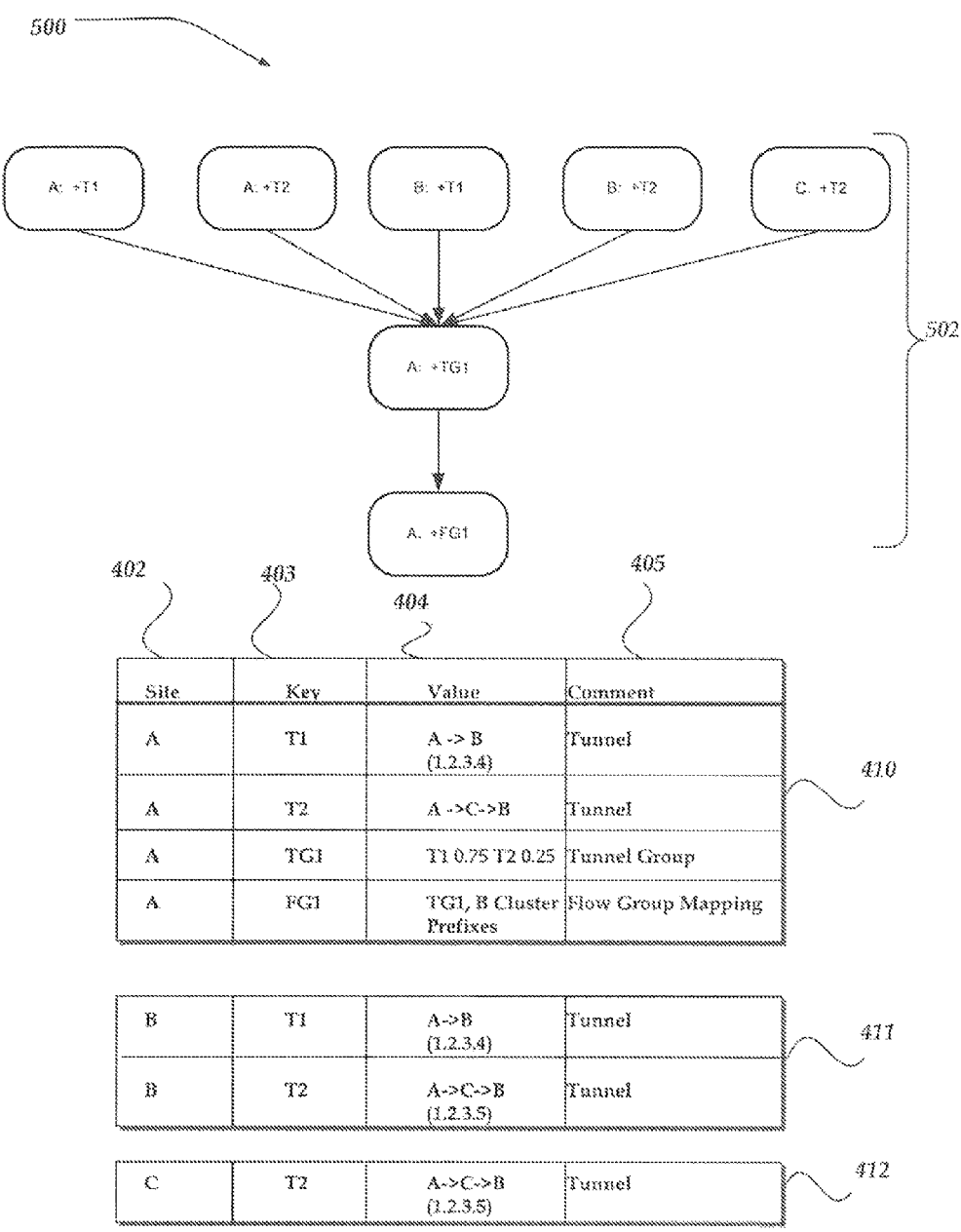
FIG. 5 illustrates one non-exhaustive, non-limiting example of a possible Operation Schedule for use in deploying the desired TED states.

FIG. 5 illustrates one non-exhaustive, non-limiting example of a possible Operation (op) Schedule for use in deploying the desired TED states. Illustration 500 of FIG. 5 may include many more or less components than those shown. The components shown, however, are sufficient to disclose an illustrative embodiment for practicing the invention. Tables 410-412 are reproduced for convenience. Also shown is Op schedule 502.

If a current TED for all forwarding devices within a network is empty, then the op schedule 502 set of ops may result. In one embodiment, the notion of "make-before-break" may be captured using a dependency graph of op commands. The dependency graph then may represent a resulting ops schedule. An edge from op1 to op2 indicates that op1 is to be executed successfully before op2 is executed. One can verify that if the ops dependency is respected, any transient state is then consistent.

In any event, as illustrated, the following would then represent the op commands for an empty TED:

Op1=add FG1 in A;
Op2=add TG1 in A;
Op3a=add T1 in A;
Op3b=add T1 in B;
Op4a=add T2 in A;
Op4b=add T2 in B;
Op4c=add T2 in C.

Given these operations, the resulting ops' dependency graph, or op schedule 502 results. The resulting operations may then be transmitted to the controllers affected, and/or to the affected forwarding devices, using the resulting op schedule. In one embodiment, multiple operations may be transmitted in parallel to affected forwarding devices/controllers. Thus, as shown, Op3a, Op3b, Op4a, Op4b, and Op4c may be transmitted in parallel. If it is determined that they were successfully implemented, the Op2 and then if successfully implemented, Op1 may be transmitted.

It is noted that once TED routes are implemented within the affected plurality of forwarding devices, then changes to a route may involve sending of ops that indicate changes to the installed current route information. For example, illustrated in FIG. 6 is one non-exhaustive, non-limiting example of a change in the desired TED states of FIG. 4 and one example of a possible Operation Schedule based on the changed states.

Figure 6:
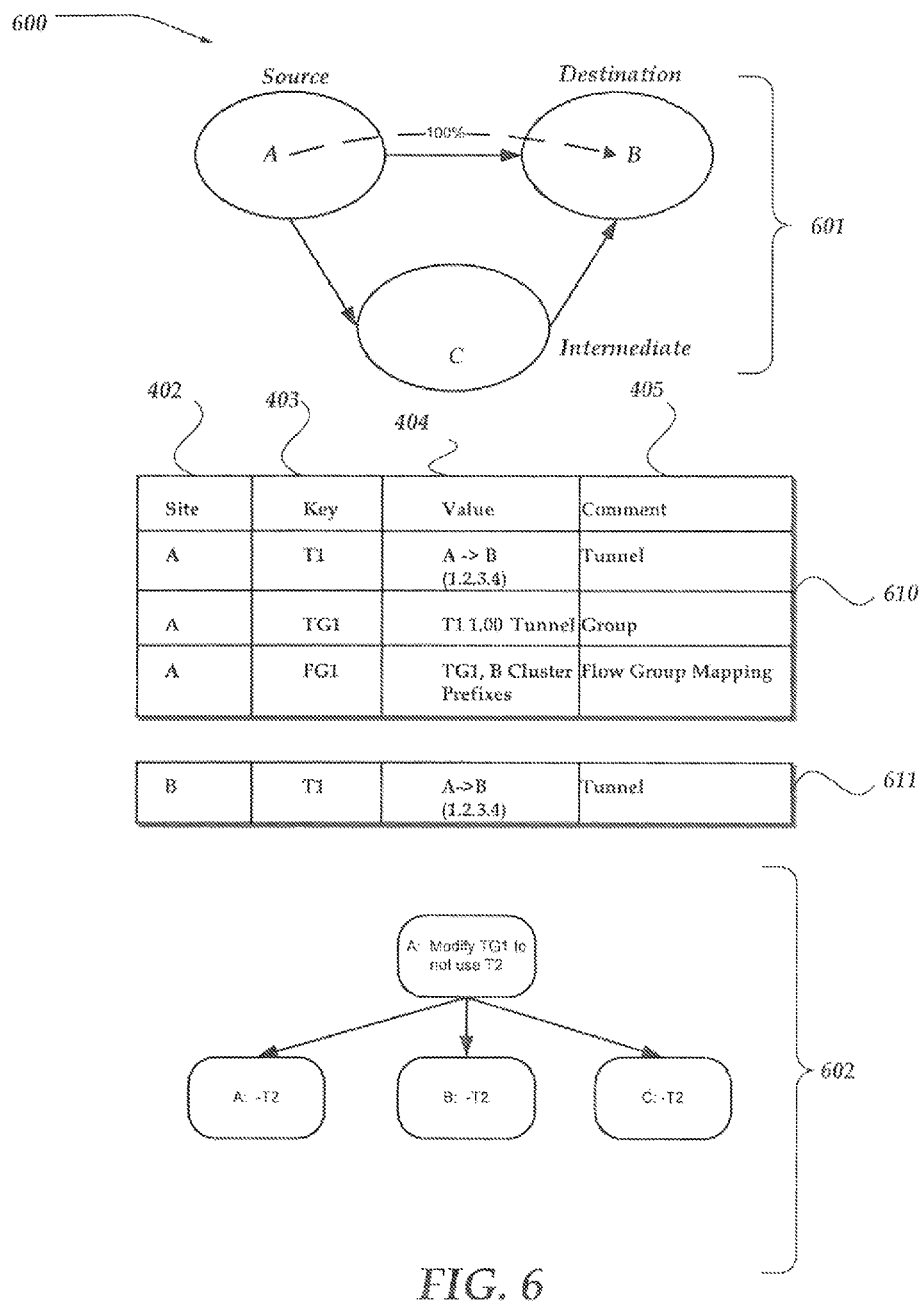
FIG. 6 illustrates one non-exhaustive, non-limiting example of a change in the desired TED states of FIG. 4 and one example of a possible Operation Schedule based on the changed states.

As illustrated, in this example, it is determined that the new path assignment is to have 100% of the traffic to be routed directly from source A to destination B, as illustrated in new topology 601 of FIG. 6. In this instance, an analysis may be performed to determine a difference between the current state information of each forwarding device and the new desired state as illustrated in topology 601. Tables 610-611 illustrate the affected or differences for affected forwarding devices (sites) A and B. Forwarding device C, although is affected in the sense that traffic is no longer directed towards it, changes to its TED need not be sent. Thus, a resulting ops dependency graph or op schedule 602 may be defined as an operational command schedule based on the determined differences. As shown the op schedule 602 is arranged in a sequence of operation commands that makes a completed new path structure before breaking an existing path structure. Thus, for example, the schedule would delete the state for tunnel T2 after is not used by any of the forwarding devices within network. In one embodiment, the commands may be issued using an RPC. However, other mechanisms may also be used.

In one embodiment, the TECM 357 of FIG. 3 is directed to ensuring that ops that are issued are successfully implemented before breaking an existing route. It is recognized, however, that ops may not be implemented successfully for a variety of reasons, including, due to lost RPCs, various network device failures and/or restarts, out of order RPCs that might result from various connection problems within a network; failure isolations, or the like. Thus, to address possible failures of proper implementation of op commands, or to address that the CTE server does not know the outcome of the operation, the invention may mark a corresponding entry in the TED as 'dirty.' When all ops for a given route mapping are successfully implemented, then the corresponding entries for the TED may be marked as 'clean.' To manage op failures, the TECM may re-issue ops; issue an op for a same key but with a different value, or even delete a key from a TED.

When a controller receives an op to change a key value pair, such as indicated in an op command, the controller may, in one embodiment, mark the status of the corresponding entry as dirty and copies the new value. Once all the underlying devices have implemented the new state successfully, the controller may mark the corresponding entry clean and then return a success indicator to the centralized service, TECM 357. The TECM 357 may then mark the corresponding key-value status as clean when it receives an explicit success form the controller. An explicit success, in one embodiment, may be any indicator that all forwarding devices affected have implemented the new path changes successfully. In another embodiment, TECM 357 may further transmit a new command, indicating that the new path, route structure is now useable.

Further, to track information about dependencies, in one embodiment, a log of old values with keys that are dirty may also be maintained. The log can then be referred to when determining dependencies and is used to indicate whether a portion of a route is still in use.

Further, while ops may be executed in order by TECM 357, for any of a variety of reasons, they may be out of order when executed by a controller. If such a situation occurs, then the resulting TECM and controller may have different TEDs. To address this situation, in one embodiment, a sequence identifier (Id) may be employed with the ops.

Briefly, a session protocol represents a concept useable to ensure that a per site TED state is consistent between the TECM 357 and controller. In one embodiment, a session may be established between the TECM 357 and each controller within a given network. In one embodiment, a session might include attributes, such as a controller site identifier; a session identifier and a sequence number. A session may be established by the TECM 357 by sending an RPC, or other communications, to the network's controller with session attributes. In one embodiment, each command from TECM 357 includes a valid session to have been established already. Further, in one embodiment, a controller may be configured to accept new op commands if:

Op.session_id is equal to a current session's session identifier; and an op.sequence_id is greater or equal to a current session's sequence identifier. Similarly, if new op commands are accepted, then the controller may set the current sequence_id to the received op.sequence identifier, and further mark rows with its. TED corresponding to 'op' dirty and issue 'ops' to the affected forwarding devices managed by the controller.

Similarly, for TECM 357 when a new 'op' is created in context of a 'session,' TECM 357 may set the op.session_id to the session.session_id, and set the op.sequence_id to the session.sequence_id. TECM 357 may mark rows in its TED corresponding to 'op' dirty and issue 'ops' to the controller. Then, when an 'op' succeeds, and before the local copy of the TED is changes, TECM 357 may confirm that op.session_id equals the session.session_id, and that op.sequence_id is greater than or equal to session.sequence_id. In one embodiment, a session may start with a sequence_id of 1 (although other values may also be selected). This sequence_id is incremented each time a new 'cliff' state is computed for a given network. All 'ops' that are part of the same 'diff' computation receives that same sequence_id. In this manner, sequence identifiers may also be used to ensure that when a new op schedule is transmitted, a previous op schedule does not interfere with it. Thus, ops across multiple networks can also be managed to ensure that new ops are not changed by previously issued ops. Use of the sequence identifier and the session identifier is directed towards ensuring that TECM 357 and affected controllers remain synchronized as operations are being performed.

Figure 7:
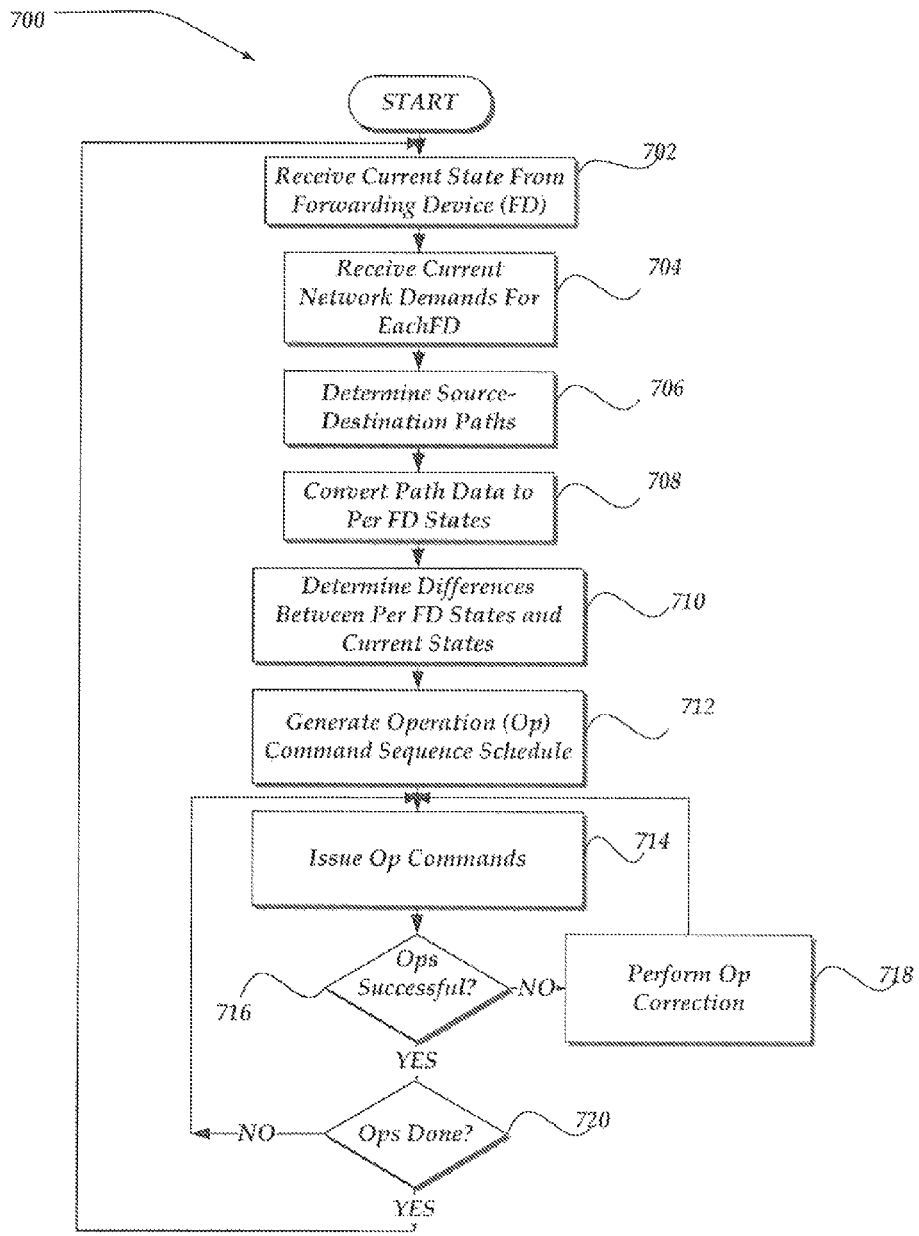
FIG. 7 illustrates a logical flow generally showing one embodiment of an overview process for use in managing centralized TED state changes and Operation Schedule distributions.

The operation of at least some of the features discussed above will now be described with respect to FIGS. 7-8. FIG. 7 illustrates a logical flow generally showing one embodiment of an overview process for use in managing centralized TED state changes and Operation Schedule distributions. Process 700 of FIG. 7 may be implemented as computer-executable instructions that when executed by one or more processors cause one or more network devices to perform actions. Process 700 may be implemented, therefore, within network device 300 of FIG. 3, for example.

Process 700 begins, after a start block, at block 702, where current state information is received from each forwarding device within a plurality of forwarding devices (FDs) within a defined network. In one embodiment, the current state information may include such information including, but not limited to whether the FD is failed over, functional and active, as well as different other characteristics including static and/or dynamic information. For example, in one embodiment, various characteristics about a capability of an FD are received, along with link characteristics, cost of a link, cost of use of an FD, identifiers for the FDs, and so forth. In one embodiment, information about a current route information that the FD may have currently implemented might also be received. In one embodiment, the current state information might be sent directly by the FDs. In another embodiment, the information might be sent through a controller associated with the network of FDs. Moreover, in one embodiment, such information might be sent based on a request for the information by the controller, and/or TECM. However, the information might also be provided based on a schedule, such as every N number of seconds, or the like. Similarly, the information might also be received based on some other event, condition, or the like. For example, when an FD enters into the network, such as when it is first initialized and attempts to connect to the rest of the FDs within the network, the FD may transmit its current state information.

In any event, processing then proceeds to block 704, where current network demands are also determined. In one embodiment, the demands may be determined based on statistically information about loads over various links within the network, congestion information, packet loss information, and so forth. Virtually any networking information that indicates a current network demand might be used. In one embodiment, TECM and/or the controller might perform various analysis to measure the demands. However, the invention is not so constrained, and the demands may be determined based on information provided to the TECM through any of a variety of mechanisms, including statistical data, or by tracking demand at each FD, link, or the like. In one embodiment, such demand data may vary over time, and thus may be received based on a schedule, a request, event, condition, or other criteria. In one embodiment, the information may also be determined based on each source-destination pair of FDs with the network.

Processing continues next to block 706, where any of a variety of routing algorithms, including those mentioned above, may be executed to determine a set of paths between various source-destination pairs of forwarding devices within the plurality of forwarding devices within the network. Continuing to block 708, the set of paths may then be converted from a target routing to a per FD state.

Processing continues next to block 710, where for each forwarding device, the set of paths are used to determine a desired state for the respective forwarding device. Further a difference between the received state information and the desired state is obtained. As discussed above, such changes may be expressed as an addition, deletion, or other modification to an entry within a TED database, or other implementation of route, information, including a routing table.

Continuing to block 712, the differences are then employed to generate a dependency graph that is useable to define an operational command schedule that is arranged in a sequence of ops commands to be issued that is directed towards making a completed new path structure before breaking an existing path structure. One embodiment of such schedules is described above.

Process 700 then flows to block 714, where the op commands are then transmitted in a manner that is directed towards managing black-holes, and/or other failed implementation attempts. For example, as noted above, entries might be marked dirty, until a successful implementation indication is received. Thus, processing flows to decision block 716, where a determination is made whether an op command is successfully implemented. If not, then processing flows to block 718 where various mechanisms such as discussed above may be employed to perform op correction, including resending op commands, or the like. Processing then loops back to block 714 to continue to issue op commands for the new route information.

At decision block 716, if it is determined that the op command is successfully implemented, then processing flows to decision block 720, where a determination is made whether there are more op commands for the new route information to be issued. If so, then processing loops back to block 714. However, if no more ops are to be issued for the new route information, then processing might loop back to block 702 to determine whether changes to the route information are to be determined.

As noted above, forwarding devices may operate based on where within a sequence of FD the FD might reside. For example, a source FD might perform different actions, than an intermediate FD, than a destination FD. Further, in one embodiment, a network infrastructure such as described above might be implemented similar to an overlay structure, layered over an existing architecture. Thus, for example, a plurality of FDs might be configured to operate within a distributed system model, where each FD independently determines its own routing policy and therefore its own routing information, routing table, and the like. The above centralized TED management services might then be overlaid onto the FDs and configured to operate based on defined characteristics of a received packet, a characteristic of a source and/or destination of a packet, a quality of service assigned to a packet, or the like. For example, in one embodiment, tables or other mechanisms might be employed that selects the centralized services based on a destination of the packet. However, the invention is not so limited. For example, in another embodiment, all packets might be configured to be communicated using the routing information obtained by an FD and is managed centrally.

Figure 8:
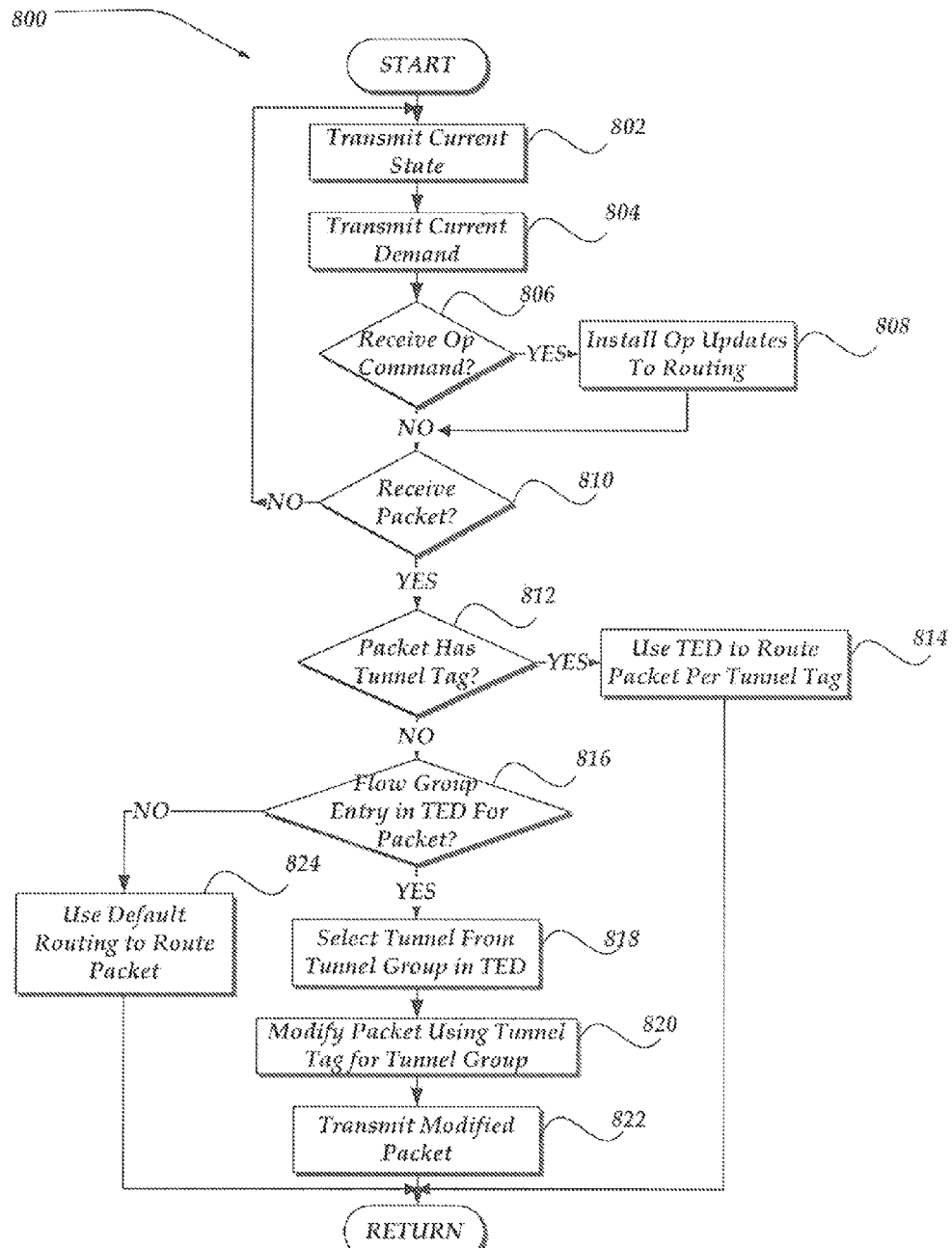
FIG. 8 illustrates a logical flow generally showing one embodiment of an overview process for use by a forwarding device within a network to route packets using in part the centralized TED state updates.

In any event, the following provides one implementation that provides route information in an overlay type of approach. Thus, FIG. 8 illustrates a logical flow generally showing one embodiment of an overview process for use by a forwarding device within a network to route packets using in part the centralized TED state updates. Process 800 of FIG. 8 may be implemented within the FDs illustrated in FIGS. 1-2.

Process 800 begins, after a start block, at block 802, where current state of the FD is transmitted. As noted above, the content of the current state and when such information is transmitted may vary based on a variety of criteria. In any event, processing flows to block 804, where the FD similarly may provide current demand information. In one embodiment, such demand information might be provided by other than the FD, however.

Processing continues to decision block 806, where a determination is made whether an op command is received. If so, processing flows to block 808, where the op command may be selectively implemented, based, for example, on a sequence identifier, session identifier, as discussed above, as well as other conditions discussed above. In one embodiment, a successful implementation might be indicated by the FD, by sending a success RPC, or the like. Processing then flows to decision block 810. At decision block 806, if an op command is not received, processing also continues to decision block 810.

At decision block 810, a determination is made whether a packet is received. If not, processing may loop back to block 802; otherwise, processing flows to decision block 812.

At decision block 812, a determination is made whether the packet includes a tunnel tag. If so, processing flows to block 814, where the TED managed by the centralized service is employed to determine how to route the packet. The packet is then routed based on the route information in the TED. Processing then returns to perform other actions. For example, in one embodiment, process 800 might loop back to block 802.

At decision block 812, if the packet does not include a tunnel tag, processing flows to decision block 816 where a determination is made whether information within the packet indicates that the packet is to be routed based on the centrally managed TED mechanism. For example, in one embodiment, when a packet is received by a source FD for a destination host, or the like, the source FD might look up into the TED to determine if there is a flow group entry for the destination indicted for the packet. In one embodiment, the destination information might be indicated by a destination address and/or other information within the packet. If the destination is not associated with a flow group entry, then processing branches to block 824; otherwise, processing continues to block 818. It should be noted that while destination information is described, the invention is not constrained to merely using destination information. Other information with a packet may also be used, including a combination of source/destination, including addresses and/or port number information, quality of service indicators, and/or the like.

At block 824, because no flow group is associated with the destination of the packet, a default routing table may be used to determine how to route the packet. The packet may then be forwarded based on route information within the default routing table. Processing then returns to a calling process to perform other actions.

At block 818, when a flow group entry is found, then a tunnel_group_id attribute may be used to determine a relevant tunnel group entry within the TED. If an entry is found, then in one embodiment, a five tuple from the packet (such as source IP, destination IP, source port number, destination port number, and quality of service) may be hashed, or otherwise combined to select a relevant tunnel from the tunnel group. That is, possible hash values are given to map to one of the available tunnels for the tunnel group. It is noted, however, that any of a variety of information within the packet may be combined, including and/or, instead of the above tuple. In one embodiment, the probability a tunnel is selected is proportional to the weight of that tunnel, relevant to other tunnels within the same tunnel group.

If an entry is not found, then the packet may instead by routed using default routing tables. Processing for successfully found entries flows next to block 820. At block 820, the packet may then be modified. In one embodiment, the packet may be encapsulated. In one embodiment, this might be done by attaching another header onto the packet, and including within the header, a tunnel tag indicating the selected tunnel to be used for routing the packet.

Processing continues to block 822, where the modified packet may then be routed to a next hop using the tunnel tag. That is, in one embodiment, the source FD may maintain a tunnel tag entry useable to determine which tunnel route to use in the TED for forwarding the packet. The FD then routes the packet. Processing then returns to a calling process to perform other actions.

Intermediate FDs as noted above, then might receive packets, determine whether they include a tunnel tag, as discussed at decision block 812), and route the packet based on such information. A destination FD determines that it is the destination FD based on the destination information within the packet, and may then terminate routing, forward the packet to the host device, or the like.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device, comprising:
    a memory device that is configured to store data; and
    a processor that is operative on the data to perform actions, including:
    receiving state information from each forwarding device within a plurality of forwarding devices within a defined network;
    determining a network demand for each of the plurality of forwarding devices within the defined network;
    determining a set of paths between source-destination pairs of forwarding devices within the plurality of forwarding devices;
    for each forwarding device in the plurality of forwarding devices:
        determining from the set of paths a desired state, and
        determining differences between the received state information and the desired state;
    defining an operational command schedule based on the determined differences, the operational command schedule being arranged in a sequence that makes a completed new path structure before breaking an existing path structure between forwarding devices; and
    transmitting each operational command, within the operational command schedule based on the arranged sequence, to one or more of the forwarding devices, wherein the one or more forwarding devices are instructed to inhibit implementation of a received operational command until receiving an indication that the new path structure is usable.

2. The network device of claim 1, wherein making a completed new path structure before breaking an existing path structure further comprises monitoring feedback from each forwarding device to ensure that any element within a new path structure that a new element within the new path structure depends upon is acknowledged as installed prior to employing the new path structure.

3. The network device of claim 1, wherein the network device further marks each transmitted operational command as invalid for use until the network device receives an indication from each forwarding device affected by the transmitted operational commands that the operational command is successfully implemented by the forwarding device; and
    when each affected forwarding device has indicated that the operational command is successfully implemented, then the network device further transmits a new command indicating that the new path structure determined by the operational command is useable.

4. The network device of claim 1, wherein the operational command schedule is configured to generate a per forwarding device routing table, the routing table including information about selected destination devices that is useable to tag packets with a tunnel tag.

5. The network device of claim 4, wherein the routing table is further useable by a forwarding device to determine whether a destination device is undefined within the routing table, such that the forwarding device is directed to employ another routing table for routing a packet to the destination device that is undefined within the routing table.

6. The network device of claim 1, wherein the network device employs at least a sequence identifier associated with each transmitted operational command such that forwarding devices are instructed to not implement a received operational command having a sequence identifier that is determined to be prior to another sequence identifier associated with another operational command.

7. The network device of claim 1, wherein transmitting of an operational command is performed using at least one of a remote procedure call (RPC), or a Extensible Markup Language (XML) message, a Java Remote Method Invocation, or a Common Object Request Broker Architecture (CORBA) message.

8. A system, comprising:
   a first network infrastructure having a plurality of forwarding devices therein; and
   a network device having a processor that is configured to perform actions, including:
      receiving state information from each forwarding device within the first network infrastructure;
      determining a network demand for each of the plurality of forwarding devices;
      determining a set of paths between source-destination pairs of forwarding devices within the plurality of forwarding devices;
      for each forwarding device in the plurality of forwarding devices:
         determining from the set of paths a desired state, and
         determining a difference between the received state information and the desired state; and
      defining an operational command schedule based on the determined difference, the operational command schedule being arranged in a sequence that makes a completed new path structure before breaking an existing path structure between, forwarding devices; and
      transmitting each operational command, within the operational command schedule based on the arranged sequence, to one or more of the forwarding devices, wherein the one or more forwarding devices are instructed to inhibit implementation of a received operational command until receiving an indication that the new path structure is usable.

9. The system of claim 8, wherein the network device employs at least a sequence identifier associated with each transmitted operational command such that forwarding devices are instructed to inhibit implementation of a received operational command having a sequence identifier that is determined to be prior to another sequence identifier associated with another operational command.

10. The system of claim 8, wherein the operational command schedule is configured to generate a per forwarding device routing table, the routing table including information about selected destination devices that is useable to tag packets with a tunnel tag.

11. The system of claim 8, wherein making a completed new path structure before breaking an existing path structure further comprises monitoring feedback from each forwarding device to ensure that any element within a new path structure that a new element within the new path structure depends upon is acknowledged as installed prior to employing the new path structure.

12. The system of claim 8, wherein the system further comprises:
   a second network infrastructure having a plurality of other forwarding devices therein; and
   the network device being further configured to perform actions, including managing centralized path information for the second network infrastructure by performing the steps of claim 8 for the other forwarding devices within the second network infrastructure.

13. The system of claim 8, wherein the first network infrastructure further comprises a controller device that communicates information about the forwarding devices to the network device and communicates the operational commands to the plurality of forwarding devices.

14. The system of claim 8, wherein a sequence identifier is associated with each operational command, the sequence identifier being used to prevent out of order operational commands from being implemented by a forwarding device.

15. A non-transitory computer-readable storage device having computer-executable instructions stored thereon such that when the storage device is accessed by a computing device, the instructions are executable by the computing device to perform actions, comprising:
   receiving state information from each forwarding device within a plurality of forwarding devices within a defined network;
   determining a network demand for each of the plurality of forwarding devices within the defined network;
   determining a set of paths between source-destination pairs of forwarding devices within the plurality of forwarding devices;
   for each forwarding device in the plurality of forwarding devices:
      determining from the set of paths a desired state, and
      determining differences between the received state information and the desired state;
   defining an operational command schedule based on the determined differences, the operational command schedule being arranged in a sequence that makes a completed new path structure before breaking an existing path structure between forwarding devices; and
   transmitting each operational command, within the operational command schedule based on the arranged sequence, to one or more of the forwarding devices, wherein a sequence identifier is associated with each operational command, the sequence identifier being used to prevent out of order operational commands from being implemented by a forwarding device.

16. The computer-readable storage device of claim 15, wherein the network device further determines whether an operational command is successfully implemented within a respective forwarding device based on receiving a success indicator, and until each element within a route table that a dependent element within the route table depends upon is successfully implemented any op commands associated with the dependent element are not transmitted.

17. The computer-readable storage device of claim 15, wherein defining the operational command schedule is performed using a dependency graph to determine which operational command is to be transmitted before at least one other operational command.

18. The computer-readable storage device of claim 15, wherein the new path structure is implemented within a forwarding device's routing table and includes information about a tunnel, a tunnel group, and a flow group mapping.

19. The computer-readable storage device of claim 15, wherein the one or more forwarding devices are instructed to not implement a received operational command having a sequence identifier that is determined to be prior to another sequence identifier associated with another operational command.

20. The computer-readable storage device of claim 15, wherein the operational command schedule is configured to generate a per forwarding device routing table, the routing table including information about selected destination devices that is useable to tag packets with a tunnel tag.

* * * * *